United States Patent

Saito et al.

[11] Patent Number: 6,107,532
[45] Date of Patent: *Aug. 22, 2000

[54] PROCESS AND SYSTEM FOR CONVERTING PLASTICS WASTE INTO OIL

[75] Inventors: Yoshihisa Saito; Takehiko Moriya, both of Sendai; Masaki Iijima, Tokyo; Wataru Matsubara, Hiroshima; Kazuto Kobayashi, Hiroshima; Naohiko Ukawa, Hiroshima, all of Japan

[73] Assignees: Tohoku Electric Power Co., Inc., Sendai; Mitsubishi Heavy Industries, Ltd., Tokyo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/057,725

[22] Filed: Apr. 9, 1998

[30] Foreign Application Priority Data

Apr. 16, 1997 [JP] Japan .................................. 9-114309

[51] Int. Cl.⁷ .............................. C07C 1/00; B09B 3/00; C10L 1/00
[52] U.S. Cl. .............................. 585/241; 44/300; 44/639
[58] Field of Search ........................... 210/721; 44/300, 44/629, 639; 585/241

[56] References Cited

U.S. PATENT DOCUMENTS

| | | | |
|---|---|---|---|
| 3,829,558 | 8/1974 | Banks et al. | 423/481 |
| 4,113,446 | 9/1978 | Modell et al. | 48/202 |
| 4,175,211 | 11/1979 | Chen et al. | 585/241 |
| 4,338,199 | 7/1982 | Modell | 210/721 |
| 4,413,969 | 11/1983 | McDonald | 425/217 |
| 5,106,513 | 4/1992 | Hong | 210/271 |
| 5,386,055 | 1/1995 | Lee et al. | 562/512.2 |
| 5,591,415 | 1/1997 | Dassel et al. | 422/241 |
| 5,744,668 | 4/1998 | Zhou et al. | 585/241 |

FOREIGN PATENT DOCUMENTS

| | | |
|---|---|---|
| 0 814 143 | 12/1997 | European Pat. Off. . |
| 05031000 | 2/1993 | Japan . |
| 06033069 | 2/1994 | Japan . |
| 06279762 | 10/1994 | Japan . |
| 09263772 | 10/1997 | Japan . |
| 10008065 | 1/1998 | Japan . |
| WO 81/00855 | 4/1981 | WIPO . |

OTHER PUBLICATIONS

European Patent Application No. 98 400 895.3 European Search Report Dated Mar. 23, 1999.

*Primary Examiner*—Margaret Medley
*Attorney, Agent, or Firm*—Myers Bigel Sibley & Sajovec, P.A.

[57] ABSTRACT

Disclosed is an economical process for treating a large amount of plastics waste in which thermoplastics, crosslinked plastics, thermosetting plastics or a mixture thereof can be continuously and rapidly degraded and converted into oil without sorting various types of plastics waste. According to this process, powdered plastics obtained by grinding thermoplastics, crosslinked plastics, thermosetting plastics or a mixture thereof is mixed with water to form a slurry, and a dispersing agent such as a water-absorbing resin, a water-soluble polymer or a surface-active agent is added thereto. The resulting mixed slurry is fed to a tubular continuous reactor where the powdered plastics is degraded under reaction conditions causing the water to be in or near its supercritical region. Finally, oil is recovered from the reaction product.

7 Claims, 1 Drawing Sheet

F I G. 1
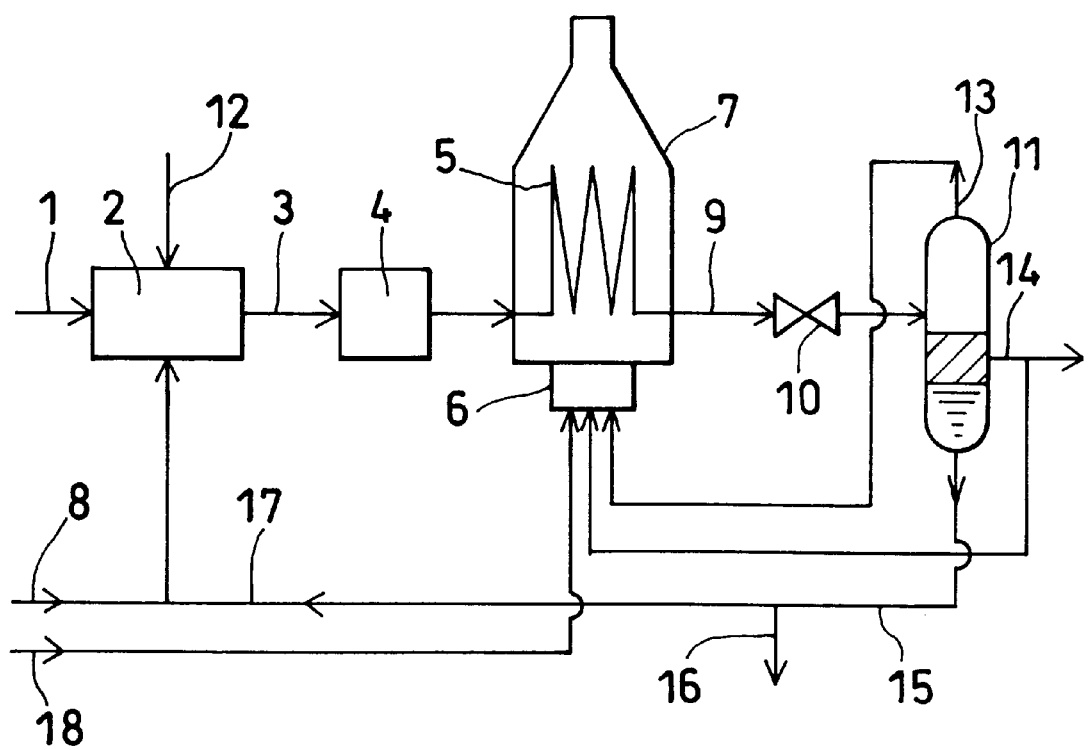

PROCESS AND SYSTEM FOR CONVERTING PLASTICS WASTE INTO OIL

BACKGROUND OF THE INVENTION

1. Field of the Invention

This invention relates to a process and system for converting plastics waste into oil by dispersing powdered plastics waste in water to form a slurry and degrading the plastics by using water in or near its supercritical region as the reaction medium.

2. Description of Related Art

Conventionally, most of various types of plastics waste have been disposed of by dumping or incineration and have not been effectively utilized as resources. Moreover, disposal by dumping has posed problems such as difficulty in securing a site for dumping and instability of the ground after dumping. On the other hand, disposal by incineration has posed problems such as damage to the furnace and the emission of harmful gases and an offensive odor. Meanwhile, the Package Recycle Law which prescribes the duty of recovering and reusing plastics was enacted in 1995. In view of these circumstances, various attempts have recently been made to reuse plastics waste as resources. As one example thereof, there has been proposed a method for degrading and converting plastics waste into oil by a reaction (i.e., the supercritical water reaction) using water in its supercritical region (i.e., supercritical water) or water near its supercritical region as the reaction medium, and thereby recovering a useful oily material (hereinafter referred to as the supercritical water method) as described in Published Japanese Translation of PCT International Publication No. 501205/1981, Japanese Patent Laid-Open No. 4225/1982, Japanese Patent Laid-Open No. 31000/1993 and Japanese Patent Laid-Open No. 279762/1994.

The term "supercritical water" refers to water in such a state that the temperature is not lower than its critical temperature (374° C.) and the pressure is not lower than its critical pressure (22.1 MPa). Supercritical water can diffuse easily into oil droplets of molten plastics. Accordingly, it is believed that the supercritical method produces less residue than pyrolysis under atmospheric pressure, and can hence achieve a higher degree of conversion into oil. Even if the temperature and pressure are lower than the critical temperature and the critical pressure, water can behave as a reaction medium in substantially the same manner as supercritical water, so long as they are in the vicinity of the critical temperature and the critical pressure.

However, in the existing state of the art, there is no well-established technique for the treatment of plastics waste according to the supercritical method. Thus, it has been difficult to feed plastics waste (in particular, plastics waste containing thermosetting resins and crosslinked resins) continuously to a reactor under supercritical conditions, and it has been necessary to provide a special or expensive apparatus for such continuous feeding purposes.

SUMMARY OF THE INVENTION

An object of the present invention is to provide an economical process for treating a large amount of plastics waste in which thermoplastics, crosslinked plastics, thermosetting plastics or a mixture thereof is continuously fed to a reactor without sorting various types of plastics waste, and is rapidly degraded and converted into oil according to the supercritical water method, and thereby carry out the disposal of plastics waste on an industrial scale.

In order to accomplish the above object, the present inventors made investigations on an economical means for treating a large amount of various types of plastics waste by continuously and rapidly degrading and converting it into oil according to the supercritical water method. As a result, it has been discovered that, if plastics waste is reduced to powder and then mixed with water to form a slurry, the plastics waste can be easily fed to a tubular continuous reactor in which water is in or near its supercritical region, and can be continuously degraded and converted into oil. The present invention has been completed on the basis of this discovery.

Accordingly, the present invention relates to a process for converting plastics waste into oil which comprises the steps of mixing powdered plastics obtained by grinding plastics waste with water to form a slurry, feeding the slurry to a tubular continuous reactor, degrading the powdered plastics under reaction conditions causing the water to be in or near its supercritical region, and recovering oil from the reaction product. The plastics waste treated by this process can be thermoplastics, crosslinked plastics, thermosetting plastics or a mixture thereof.

Moreover, the present invention also relates to a process for converting plastics waste into oil as described above wherein a dispersing agent is added to the slurry composed of powdered plastics and water. As the dispersing agent, there may be used a water-absorbing resin, a water-soluble polymer, a surface-active agent or a mixture thereof. More specifically, the water-absorbing resin can be a crosslinked product derived from a polyacrylic acid salt, isobutylene-maleic acid salt, polyvinyl alcohol, polyacrylamide, polyoxyethylene or starch-polyacrylic acid salt. The water-soluble polymer can be a natural polymer such as starch, mannan, galactan or gelatin; a semisynthetic polymer such as carboxymethylcellulose, carboxymethylstarch or methylcellulose; or a synthetic polymer such as polyvinyl alcohol or polyoxyethylene. The surface-active agent can be an anionic surface-active agent, a cationic surface-active agent, an amphoteric surface-active agent or a nonionic surface-active agent.

Furthermore, the present invention also relates to a process for converting plastics waste into oil as described above wherein the water separated from the reaction product is used to prepare a slurry composed of powdered plastics and water.

In another aspect, the present invention relates to a system for converting plastics waste into oil which comprises mixing means for mixing powdered plastics obtained by grinding plastics waste with water to form a slurry, a tubular continuous reactor, slurry feeding means for feeding the slurry to the tubular continuous reactor, heating means for heating the tubular continuous reactor and thereby degrading the powdered plastics under reaction conditions causing the water to be in or near its supercritical region, and a separator for separating oil from the degradation product of the powdered plastics.

Moreover, the present invention also relates to a system for converting plastics waste into oil as described above which further includes dispersing agent addition means for adding a dispersing agent to the mixing means.

The present invention makes it possible to treat a large amount of plastic waste by reducing the plastics waste to powder without sorting various types of plastics waste, preparing a slurry from the powdered plastics and water, feeding the slurry continuously to a reactor by a suitable means such as a slurry pump, and rapidly degrading and converting the powdered plastics into oil according to the supercritical water method.

BRIEF DESCRIPTION OF THE DRAWINGS

FIG. 1 is a flow diagram illustrating one embodiment of the process and system of the present invention.

DETAILED DESCRIPTION OF THE PREFERRED EMBODIMENT

The present invention will be more specifically described hereinbelow.

The types of plastics which can be treated according to the present invention include thermoplastics, crosslinked plastics, thermosetting plastics and mixtures thereof.

The thermoplastics include not only general-purpose plastics but also engineering plastics. Specific examples thereof are polyethylene, polypropylene, poly-4-methylpentene-1, ionomers, polystyrene, AS resin, ABS resin, polyvinyl chloride, polyvinylidene chloride, methacrylic resin, polyvinyl alcohol, EVA, polycarbonates, various nylons, various aromatic and aliphatic polyesters, thermoplastic polyurethanes, cellulosic plastics and thermoplastic elastomers.

The crosslinked plastics include, for example, those obtained by crosslinking the above-described thermoplastics by exposure to radiation, electron rays, light or the like, by the action of a peroxide or the like, or by the addition of a crosslinking monomer.

The thermosetting plastics include not only general-purpose plastics but also engineering plastics. Specific examples thereof are phenolic resins, urea resins, melamine resins, furan resins, silicone resin, epoxy resins, unsaturated polyester resins, allyl resins, thermosetting polyurethane resins and rubbers.

These plastics may be used alone, in admixture of two or more, or in the form of a composite material such as alloy.

One feature of the present invention is that not only thermoplastics but also crosslinked plastics and thermosetting plastics can be treated. Accordingly, various types of plastics waste need not be sorted, so that the recovery and treatment of plastics waste are easy.

In the present invention, plastics waste is ground to powder and then mixed with water to form a slurry.

The particle size of the powder is preferably not greater than about 1 mm in diameter. If the particle size is unduly large, it will be difficult to feed the slurry by slurry feeding means. As the particle size is reduced, the feed by slurry feeding means becomes easier, but the power requirements for grinding and the volume of the powder are increased. Accordingly, the particle size should usually be in the range of 0.1 to 1 mm.

As to the particle size, bulk materials should be reduced to particles having a diameter or side length of 0.1 to 1 mm, but sheet-like materials (e.g., films) may be reduced to pieces which correspond to a volume of about 1 $mm^3$ when they are formed into a slurry.

As the device for grinding plastics waste to a powder having a particle size in the aforesaid range, there may be used any of conventionally known devices such as a cutter mill and a hammer mill.

Plastics waste which is originally in the form of particles having a size in the aforesaid range need not be subjected to further treatment. Some types of plastics waste may previously be freed of components other than plastics or cleaned. However, inorganic matter such as fillers may be present in plastics waste to be treated.

No particular limitation is placed on the type, temperature, pressure and other properties of water used to prepare a slurry. The water separated from the oil after completion of the reaction may be used for this purpose.

The weight ratio of the powdered plastics to water (the powdered plastics : water) may be in the range of 1:0.3 to 1:20 and preferably 1:2 to 1:10, though it depends on the type of the plastics.

In order to prepare a slurry from powdered plastics and water, there may be used any of various conventionally known mixing means for mixing a powder with a liquid, such as a vertical or horizontal mixing tank fitted with a stirrer, and a tubular mixer.

A slurry composed of powdered plastics and water may be prepared simply by mixing them with stirring. Alternatively, they may be mixed in the presence of a dispersing agent.

The dispersing agent used in the present invention can be a water-absorbing resin, a water-soluble polymer, a surface-active agent or a mixture thereof.

The dispersing agent may previously be added to water, or may be added to the slurry composed of plastics waste and water. The addition of the dispersing agent may be carried out by any of conventionally known dispersing agent addition means such as a fluid metering pump and a powder metering feeder.

Specific examples of the water-absorbing resin include crosslinked compounds derived from polyacrylic acid salts (e.g., sodium salt; the same shall apply hereinafter), isobutylene-maleic acid salts, polyvinyl alcohol, poval-polyacrylic acid salts, polyacrylonitrile hydrolyzate (in particular, polyacrylamide), and starch-polyacrylonitrile hydrolyzate (in particular, starch-polyacrylic acid salts).

The water-absorbing resin may be added in an amount of not less than 0.05% by weight, preferably 0.1 to 1% by weight, based on the water.

The water-soluble polymer can be a natural polymer, a semisynthetic polymer, a synthetic polymer or a mixture thereof. Specific examples of the natural polymer include starch, mannan, galactan, casein, gum arabic, gluten, guar gum, alginate and gelatin; specific examples of the semi-synthetic polymer include carboxymethylcellulose salts (e.g., sodium salt; the same shall apply hereinafter), methylcellulose, carboxymethyl-starch salts, dialdehydostarch, starch-glycolic acid salts, fibrin-glycolic acid salts, alginic acid ethylene glycol ester and alginic acid propylene glycol ester; and specific examples of the synthetic polymer include polyvinyl alcohol and polyoxyethylene.

The water-soluble polymer may be added in an amount of not less than 0.05% by weight, preferably 0.2 to 2% by weight, based on the water.

The surface-active agent can be an anionic surface-active agent, a cationic surface-active agent, an amphoteric surface-active agent or a nonionic surface-active agent.

Specific examples of the anionic surface-active agent include soap, alkylsulfonates, alkylbenzenesulfonates, sulfosuccinates, α-olefinsulfonates, N-acylsulfonates, alkylsulfates, alkyl ether sulfates, alkylphosphates and alkyl ether phosphates.

Specific examples of the cationic surface-active agent include aliphatic amine salts and their quaternary ammonium salts, aromatic quaternary ammonium salts and heterocyclic quaternary ammonium salts.

Specific examples of the amphoteric surface-active agent include carboxybetaine, sulfobetaine, imidazoline type surfactants and lecithin.

Specific examples of the nonionic surface-active agent include alkyl polyoxyethylene ethers, alkyl aryl polyoxyethylene ethers, alkyl aryl formaldehyde-condensed polyoxyethylene ethers, polyoxyethylene polyoxypropylene ethers, glycerol ester polyoxyethylene ethers, glycerol esters, polyethylene glycol fatty acid esters, polyglycerol esters, sorbitan esters, propylene glycol esters, sucrose fatty acid esters, glycerol ester polyoxyethylene ethers, sorbitan ester polyoxyethylene ethers and sorbitol ester polyoxyethylene ethers.

The surface-active agent may be added in an amount of not less than 0.01% by weight, preferably 0.05 to 1% by weight, based on the water.

For example, when the dispersing agent comprises a water-absorbing resin, the resulting slurry is in the form of a gel. When a surface-active agent is used, powdered plastics comes to have a greater affinity for water and is easily dispersed therein to form a less viscous slurry. When an agent for increasing consistency such as a water-soluble polymer is used, a highly viscous slurry is formed. As used herein, the term "slurry" comprehends all of the above-described slurries.

Accordingly, various slurry feeding means may be used to feed the slurry continuously to a reactor. Specific examples of the slurry feeding means include a volute pump for use with slurries, a piston type delivery device (e.g., a plunger pump) and a hydrohoist.

Consequently, a larger amount of plastics waste can be fed to the reactor more economically and more rapidly, as compared with the case in which a pressure feeding device such as an extruder is used.

Since the tubular continuous reactor used in the present invention functions to degrade powdered plastics under reaction conditions causing water to be in or near its supercritical region, a thick-walled tube made of a material which can withstand these conditions is used. The reactor may be rectilinear, but may also be used by winding it into a coil or bending it into a U-shape.

Specific examples of the material of the reactor include metallic materials such as carbon steel, special steels (e.g., Ni, Cr, V and Mo steels), austenitic stainless steel, Hastelloys and titanium; such metallic materials lined with glass, ceramics, Karbate or the like; and such metallic materials clad with other metals.

The reaction tube constituting the reactor has a length of 10 to 100 m, though it depends of the type of plastics to be treated and the conditions of degradation.

The reactor is heated by a suitable heating means. Useful heating means include an electric heater, a burner, combustion gas, steam, a heating medium and the like. However, the reactor is preferably heated by a heating furnace using a burner, so that gas and oil obtained as plastics degradation products may be used as fuel.

The reaction conditions employed for obtaining oil by degrading a slurry composed of powdered plastics and water must be such that the temperature is not lower than the critical temperature of 374° C. and the pressure is not lower than the critical pressure of 22.1 MPa so as to cause the water to constitute a medium in its supercritical region, or that the pressure is not lower than 0.8 time the critical pressure and the temperature is not lower than 300° C. so as to cause the water to constitute a medium near its supercritical region. In order to degrade powdered plastics in the presence of water in or near its supercritical region, the temperature should be in the range of 350° to 650° C. and preferably 400° to 600° C. If the temperature is unduly high, the production of a gaseous component will be increased.

The reaction time employed to degrade powdered plastics and thereby produce oil should be 30 minutes or less and preferably 10 minutes or less. If the reaction time is unduly long, the throughput will be reduced, the production of a gaseous component will be increased, and the formation of carbon will result.

The reaction product, either as such or after being cooled if necessary, is passed through a flush valve as required and fed to a separator. In this separator, the reaction product is separated into a gaseous component and a liquid component, and the liquid component is further separated into oil and water. As used herein, the expression "the liquid component is separated" means separation by allowing it to settle, and a settler or the like is used as the separator.

When a dispersing agent is used, this dispersing agent is also decomposed and exerts no influence on the separation of the liquid component.

The gaseous component consists essentially of hydrocarbons having 4 or less carbon atoms. This gaseous component may be used as the fuel for heating the reactor, either directly or after the removal of hydrogen chloride, or may be used for other purposes.

The oil contains hydrocarbons ranging from low-boiling hydrocarbons having 5 or more carbon atoms to hydrocarbons having a boiling point of 500° C. at atmospheric pressure. The oil is discharged out of the system and used as fuel, a raw material, a compounding ingredient and the like, but a portion thereof may be used as the fuel for heating the reactor.

When the gaseous component and oil thus obtained are used as fuels, they contain less sulfur and heavy metals responsible for environmental pollution, and have a higher calorific value in combustion, as compared with heavy oil and coal. Moreover, the oil may be subjected to fractional distillation and the resulting fractions may be used as various type of fuel, raw materials for chemical syntheses, hydrocarbon solvents, and the like.

A portion of the water is withdrawn out of the system and disposed of, while the remainder may be reused to prepare a slurry of powdered plastics.

If necessary, the water may be passed through a filter or strainer to remove any solid matter such as fillers.

One embodiment of the process and system of the present invention is described below with reference to FIG. 1.

Powdered plastics 1, which is obtained by pretreating plastics waste and then grinding it as required, is fed to mixing means 2 (e.g., a mixing tank). In this mixing means 2 containing water 8, powdered plastics 1 is mixed with stirred water 8, with or without the addition of a dispersing agent 12. Thus, a slurry 3 is formed.

This slurry 3 is continuously fed to a tubular continuous reactor 5 by slurry feeding means 4. Tubular continuous reactor 5 is heated to a predetermined temperature in a heating furnace 7 equipped with heating means 6 (i.e., a burner in this case). Thus, the water in the slurry constitutes a water medium in or near its supercritical region, so that the powdered plastics is degraded to yield a reaction product 9.

Reaction product 9 discharged from tubular continuous reactor 5 is passed through a flush valve 10 and fed to a separator 11 where it is separated into a gaseous component 13 and a liquid component.

Gaseous component 13 is discharged from the top of separator 11 and fed to heating means 6 where it is burned with the aid of air 18.

In separator 11, the liquid component is further separated into oil 14 and water 15. After oil 14 is withdrawn from separator 11, a portion thereof is fed to and burned in heating means 6, and the remainder is discharged out of the system and used for other purposes.

A portion of water 15 is discharged out of the system as withdrawn water 16, and the remainder is recycled to mixing tank 2 as circulating water 17.

The present invention is more specifically explained with reference to the following examples. However, it is to be understood that the present invention is not limited thereto.

EXAMPLES 1 to 6

Using the system illustrated in FIG. 1, powdered wire covering waste comprising crosslinked polyethylene or a mixture of crosslinked polyethylene and polyethylene was dispersed in water, with or without the addition of a dispersing agent, and degraded under the conditions shown in Table 1.

The tubular continuous reactor comprised a thick-walled reaction tube having an inside diameter of 5 mm, an outside diameter of 10 mm and a length of 60 m.

The results thus obtained are shown in Table 1.

Various types of slurries could be continuously fed to the reactor by means of a slurry pump. Moreover, as can be seen from Table 1, plastics waste could be continuously degraded in a short period of time, and fuel gas and oil could be obtained in high yield.

TABLE 1

| Conditions | | Example 1 | Example 2 | Example 3 | Example 4 | Example 5 | Example 6 |
|---|---|---|---|---|---|---|---|
| Amount of plastics waste (kg/hr) | | 0.3 | 0.5 | 1.2 | 0.5 | 0.5 | 0.8 |
| Composition of plastics waste (wt. %) | | | | | | | |
| Polyethylene | | 0 | 50 | 50 | 50 | 50 | 50 |
| Crosslinked polyethylene | | 100 | 50 | 50 | 50 | 50 | 50 |
| Average particle diameter of powder (mm) | | 0.37 | 0.62 | 0.62 | 0.62 | 0.62 | 0.62 |
| Concentration of plastics in slurry (wt. %) | | 16.7 | 25.0 | 25.0 | 25.0 | 25.0 | 16.7 |
| Amount of dispersing agent based on water (wt. %) | Water-absorbing resin A | — | 0.2 | 0.2 | — | — | — |
| | Water-absorbing resin B | — | — | — | 0.2 | — | — |
| | Water-soluble polymer C | — | — | — | — | 0.5 | — |
| | Surface-active agent D | — | — | — | — | — | 0.1 |
| Reaction conditions | | | | | | | |
| Temperature (° C.) | | 480 | 480 | 500 | 480 | 480 | 500 |
| Pressure (MPa) | | 30 | 30 | 30 | 30 | 30 | 30 |
| Time (min) | | 5 | 5 | 2 | 5 | 5 | 2 |

TABLE 1-continued

| Conditions | Example 1 | Example 2 | Example 3 | Example 4 | Example 5 | Example 6 |
|---|---|---|---|---|---|---|
| Yield (wt. %) | | | | | | |
| Gas | 14 | 14 | 17 | 13 | 13 | 18 |
| Oil | 84 | 85 | 82 | 87 | 86 | 81 |

In Table 1, water-absorbing resin A is crosslinked polyacrylic acid sodium salt, water-absorbing resin B is a sodium salt of a crosslinked starch-acrylic acid graft copolymer, water-soluble polymer C is carboxymethylcellulose sodium salt, and surface-active agent D is polyethylene glycol stearate.

What is claimed is:

1. A process for converting plastics waste into oil which comprises the steps of feeding a slurry composed of powdered plastics a dispersant and water to a tubular continuous reactor, degrading the powdered plastics under reaction conditions causing the water to be in or near its supercritical temperature, and recovering oil from the reaction product; and wherein a dispersing agent is selected from the group consisting of a water-absorbing resin, a water-soluble polymer, a surface-active and a mixture thereof.

2. A process for converting plastics waste into oil as claimed in claim 1 wherein the plastics is thermoplastics, crosslinked plastics, thermosetting plastics or a mixture thereof.

3. A process for converting plastics waste into oil as claimed in claim 1 wherein the water-absorbing resin is a crosslinked product derived from a polyacrylic acid salt, isobutylene-maleic acid salt, polyvinyl alcohol, polyacrylamide, polyoxyethylene or starch-polyacrylic acid salt.

4. A process for converting plastics waste into oil as claimed in claim 1 wherein the water-soluble polymer is a natural polymer, a semisynthetic polymer, a synthetic polymer or a mixture thereof.

5. A process for converting plastics waste into oil as claimed in claim 4 wherein the natural polymer is starch, mannan, galactan or gelatin, the semisynthetic polymer is carboxymethylcellulose, carboxymethylstarch or methylcellulose, and the synthetic polymer is polyvinyl alcohol or polyoxyethylene.

6. A process for converting plastics waste into oil as claimed in claim 1 wherein the surface-active agent is an anionic surface-active agent, a cationic surface-active agent, an amphoteric surface-active agent or a nonionic surface-active agent.

7. A process for converting plastics waste into oil as claimed in claim 1, 2, 3, 4, 5 or 6 wherein water is separated from the reaction product and used to prepare a slurry composed of powdered plastics and water.

* * * * *